Patented Mar. 1, 1932

1,847,561

UNITED STATES PATENT OFFICE

RUDOLF HEIDENREICH, OF LEVERKUSEN-ON-THE-RHINE, GERMANY, ASSIGNOR TO GENERAL ANILINE WORKS, INC., OF NEW YORK, N. Y., A CORPORATION OF DELAWARE

COMPOUND OF THE IMIDAZOLE BENZANTHRAQUINONE SERIES

No Drawing. Original application filed July 30, 1928, Serial No. 296,412, and in Germany October 23, 1926. Divided and this application filed June 13, 1930. Serial No. 461,039.

The present invention relates to new compounds of the benzanthraquinone series, more particularly to compounds of the general formula:

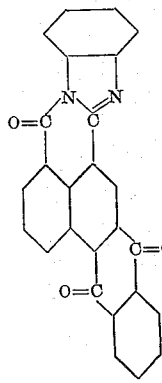

wherein the nuclei may be substituted by monovalent substituents.

I have found that by suitably heating the imidazoles, obtainable by heating a 1.8-naphthalicanhydride-4-benzoyl-o-carboxylic acid with an aromatic ortho-diamine with strong sulfuric acid, they can be transformed into the corresponding benzanthraquinone compounds without an essential part of the imidazole ring being split up and the corresponding dicarboxylic acid or dicarboxylic acid anhydride being formed. This shows that the formation of the benzanthraquinone ring precedes the splitting up of the imidazole ring and it involves the valuable technical advantage that comparatively complicated compounds of the benzanthraquinone series can be prepared by practically very simple and cheap methods.

The benzanthraquinone compounds which can be prepared in the above described simple manner are valuable orange or darker colored vat dyestuffs of good fastness properties.

The following example will illustrate my invention without restricting it thereto, the parts being by weight.

Example 41.8 parts of 1.8-naphthoyl-benzimidazol-4-benzoyl-ortho-carboxylic acid, obtainable from 1.8-naphthalic acid anhydride-4-benzoyl-ortho-carboxylic acid and ortho-phenylene-diamine, are dissolved in 200 parts of concentrated sulfuric acid and heated for a short time from about 170° C. to 180° C. On pouring into a large amount of water there separates from the sulfuric acid solution the beautiful orange colored imidazole of the corresponding benzanthraquinone, which is a valuable orange vat dyestuff. The imidazole probably corresponds to the formula:

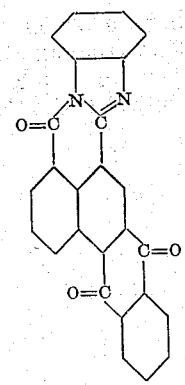

In a quite analogous manner other products of interaction from the substitution products of 1.8-naphthalic anhydride-4-benzoyl-ortho-carboxylic acid with aromatic ortho-diamines can be transformed into the corresponding benzanthraquinone derivatives in strong sulfuric acid solution at elevated temperature.

It may be mentioned that the above formulæ given for my products are not quite definite. The products may also be isomerics of the formula:

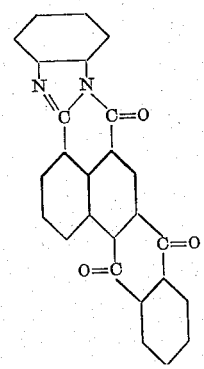

wherein the different nuclei may be substituted by monovalent substituents and so far it has not been possible to clear this question definitely. However, according to my knowledge regarding these compounds I believe the formulæ given to be the correct ones.

This is a division of my co-pending application Serial No. 296,412, filed July 30th, 1928.

I claim:—

The dyestuff of the probable formula:

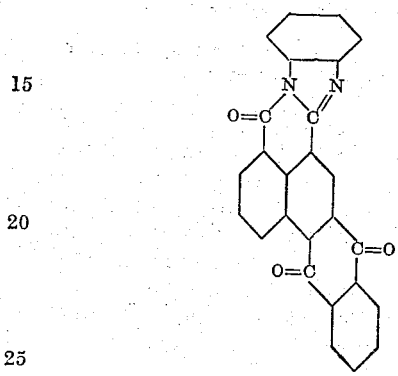

said product being an orange colored compound dyeing cotton from an alkaline hydrosulfite vat strong orange shades.

RUDOLF HEIDENREICH.